May 31, 1949.  F. S. NANNA  2,471,769
WHIPPING MACHINE

Filed Jan. 4, 1946  3 Sheets-Sheet 1

INVENTOR.
Frank S. Nanna
BY Albert G. McCaleb
Atty.

May 31, 1949.　　　　F. S. NANNA　　　　2,471,769
WHIPPING MACHINE
Filed Jan. 4, 1946　　　　　　　　　　　3 Sheets-Sheet 2
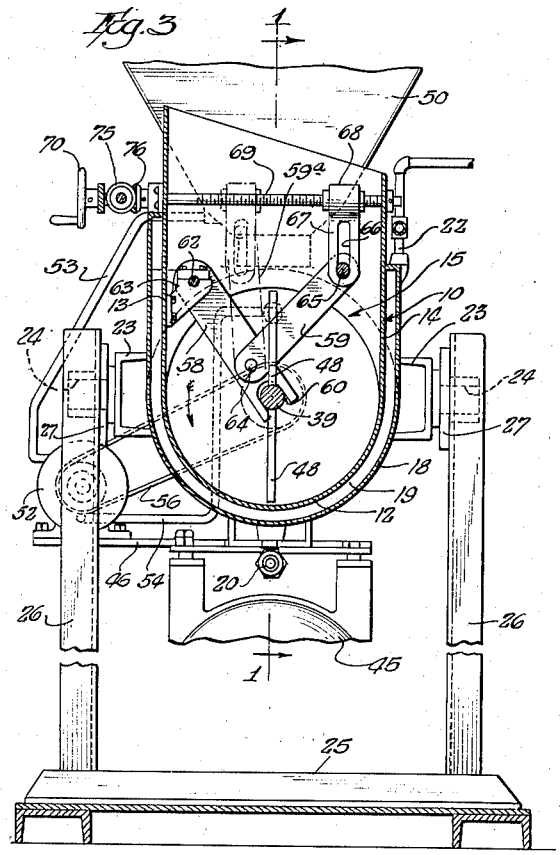
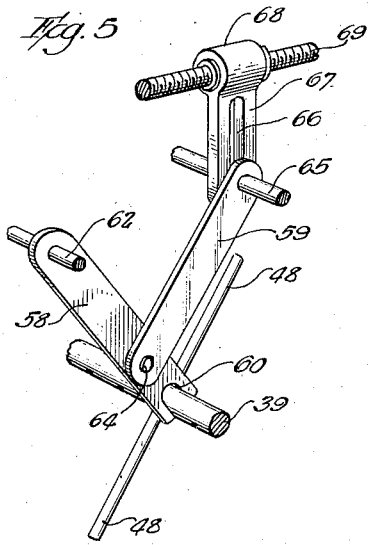
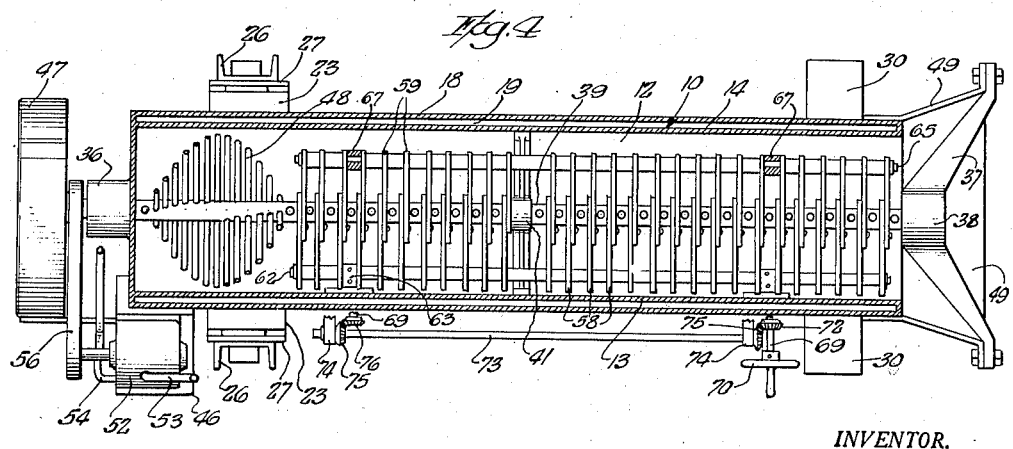
INVENTOR.
Frank S. Nanna
BY Albert S. McCaleb
Atty.

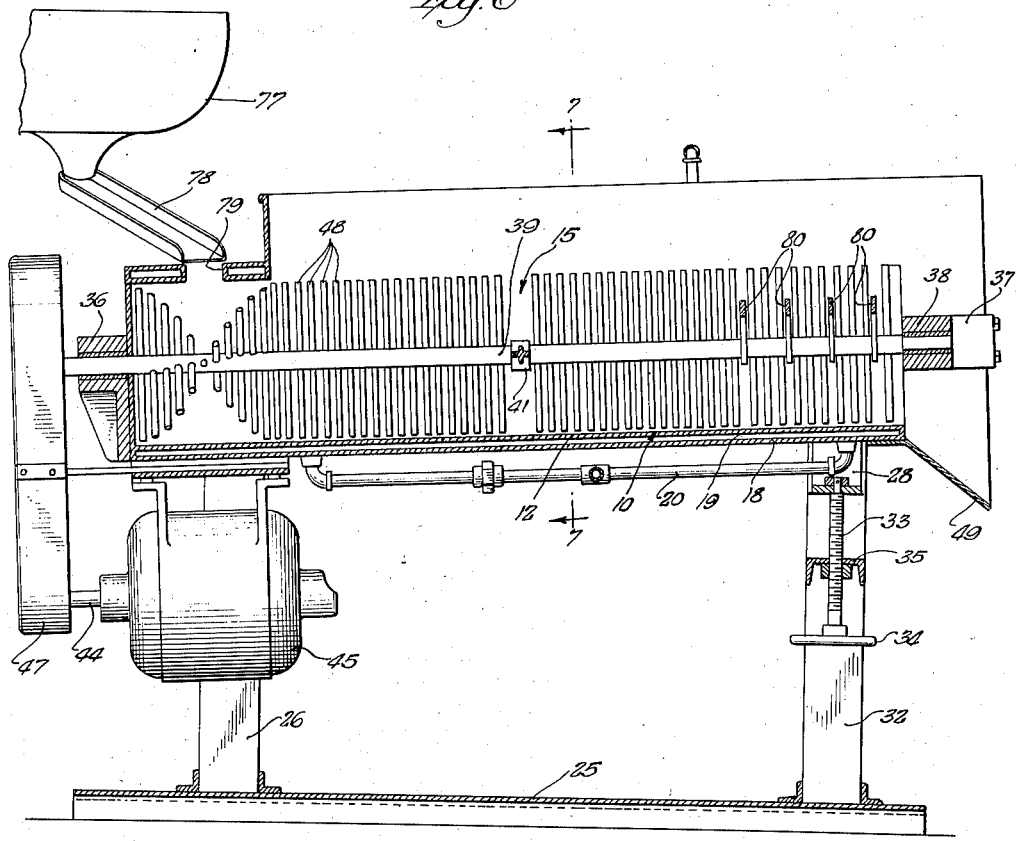
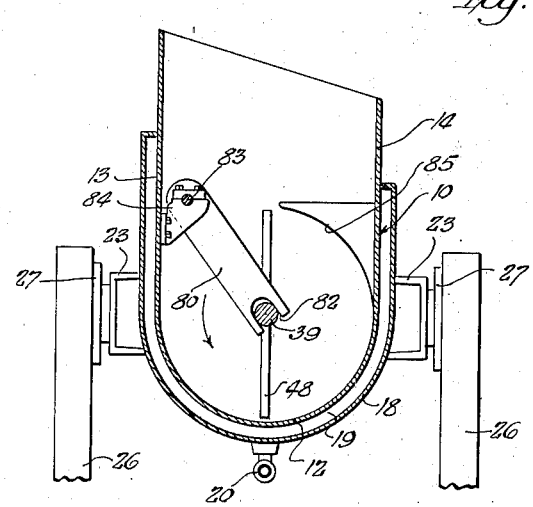

Patented May 31, 1949

2,471,769

UNITED STATES PATENT OFFICE 2,471,769

WHIPPING MACHINE

Frank S. Nanna, North Lake Village, Ill.

Application January 4, 1946, Serial No. 639,085

7 Claims. (Cl. 259—6)

This invention relates to whipping machines, and more particularly to those of a type adapted or adaptable to the whipping of materials of the class used in confections and the like, such as marshmallow or fondant.

It is a general object of my present invention to provide an improved whipping machine adaptable to the whipping to a desired consistency of materials such as marshmallow or fondant as a continuous process, as distinguished from a batch process.

Another object of my invention is to provide a whipping machine suited to continuous whipping operation and wherein certain parts are interchangeable for adapting the machine to the whipping of somewhat different types of material like marshmallow and fondant.

As another object my invention contemplates the provision of an improved whipping machine having elements which are adjustable to alter the whipping action of the machine to suit the consistency of the material during whipping and so as to produce a resultant material having the desired firmness and texture.

My invention has for a further object the provision of a whipping machine having a whipping chamber through which the material progresses during the whipping operation and in at least a portion of which chamber the movable agitating elements pass between vanes to improve the whipping action.

Other objects and advantages of the invention will be apparent from the following description and the accompanying drawings, in which similar characters of reference indicate similar parts throughout the several views.

Referring to the drawings of which there are three sheets:

Fig. 3 is a transverse sectional view taken substantially on a line 3—3 of Fig. 1;

Fig. 4 is a top plan view of the whipping machine illustrated in Figs. 1, 2 and 3;

Fig. 5 is a fragmentary perspective view providing a detailed illustration of certain parts of the whipping machine shown in Figs. 1 to 4 inclusive;

Fig. 6 is a longitudinal vertical section of a whipping machine similar to that illustrated in Figs. 1 to 4 inclusive but modified in certain respects to improve the whipping action of the machine for certain materials; and Fig. 7 is a fragmentary transverse sectional view taken substantially on a line 7—7 of Fig. 6.

Figure 1:
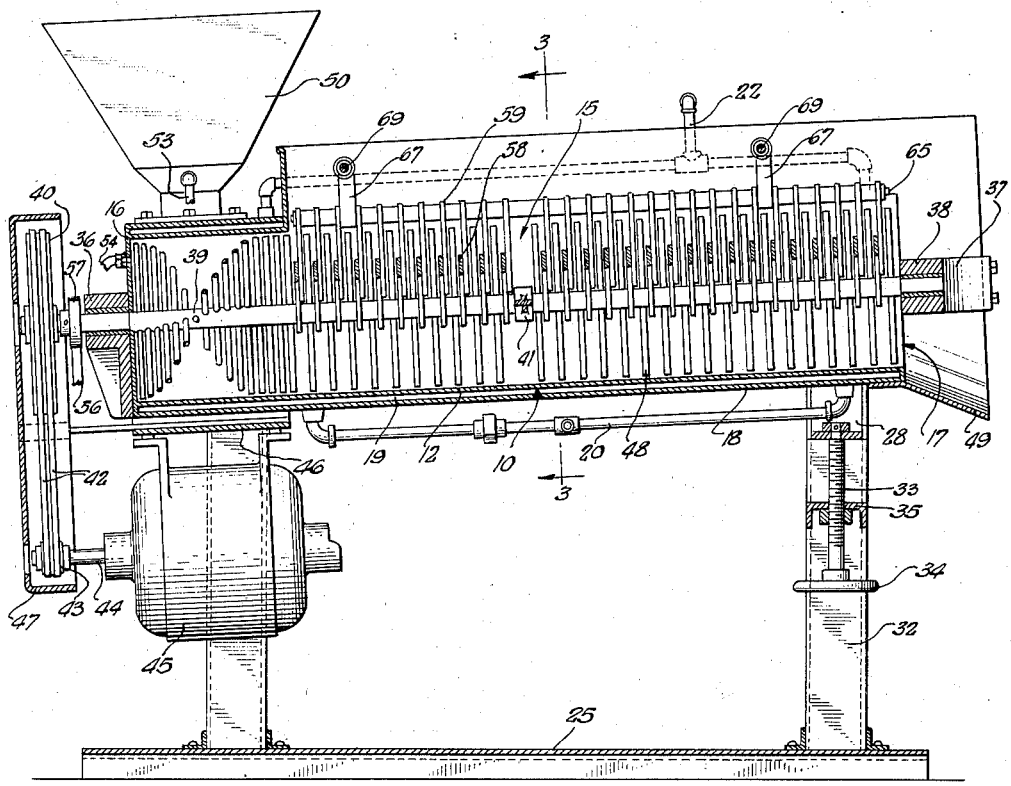
Fig. 1 is a longitudinal vertical section taken through a whipping machine embodying a preferred form of my present invention, the position of the section being substantially illustrated by the line 1—1 and accompanying arrows in Fig. 3.

In the exemplary forms of my invention which are disclosed in the drawings, I have illustrated two whipping machines which are generally similar but which have been varied in certain respects and as may be accomplished by interchangeable parts better to adapt the machine for producing the desired consistency of different types or kinds of confectionery materials. For example, the whipping machine disclosed in Figs. 1 to 5 inclusive is particularly well suited to the aeration of materials such as marshmallow, while certain alterations of the structure, as depicted in Figs. 6 and 7, are desirable for whipping materials such as fondant.

There are certain parts of the structure which are common to both forms of my whipping machine which parts comprise the more basic elements of the machines and will be first described. As shown in Figs. 1 to 4 inclusive, 6 and 7, an elongated housing 10, having a semi-cylindrical bottom 12 and substantially vertical side walls 13 and 14, provides a whipping chamber 15. One end of the housing is closed by an end wall 16 while the other end is open to provide a discharge opening 17 through which the whipped material flows from the whipping chamber. Desirably one side of the housing is higher than the other to permit easier access to and viewing of the interior of the whipping chamber and to allow for the building up of the material therein during the whipping operation and on the side of the chamber toward which the whipping instrumentality normally rotates.

An outer housing 18, generally conforming to the shape of the inner housing 10 and spaced therefrom, is secured to the outer surface of the housing 10 to provide a water jacket 19 through which cooling water is circulated to cool the material being whipped during the whipping operation. The height of the water jacket on the two sides of the whipping chamber is generally proportional to the heights of the side walls 13 and 14 and is sufficient to cool the surfaces of the whipping chamber to levels normally reached by the material during the whipping. Cooling water is supplied to the water jacket 19 through a feed pipe 20 which desirably communicates with the lower portion of the jacket at positions near both ends thereof. An overflow pipe 22 communicates with the water jacket, preferably near the top of one side. Through this pipe the cooling water is discharged from the jacket after circulation therein.

Figure 2:
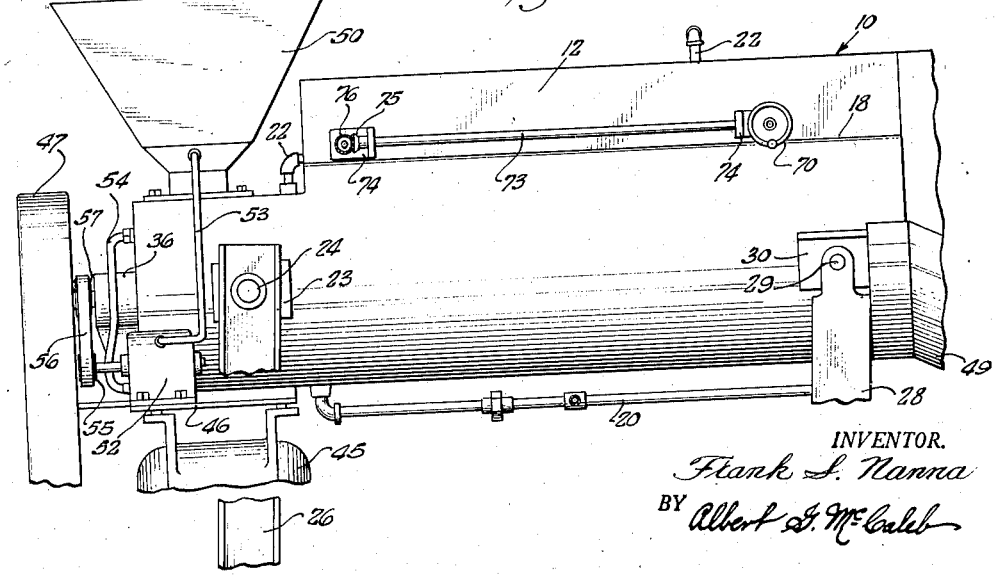
Fig. 2 is a fragmentary side elevational view of the whipping machine depicted in Fig. 1.

As shown in Figs. 2 and 3, channels 23 are secured to opposite sides of the outer surface of the housing 18 near the closed end of the whipping chamber 15, which channels carry coaxial laterally projecting trunnions 24. A base 25 has upright standards 26 at one end thereof which carry suitable bearings 27 in which the trunnions 24 are rotatably mounted to support the housing of the whipping machine for vertical swinging movement about the axis of those trunnions.

At the other end of the housing and as depicted in Figs. 1 and 2, a substantially U-shaped yoke 28 encompasses the lower portion of the housing and has its ends rotatably connected to the housing through coaxial trunnions 29 carried by brackets 30 on the outer surface of the housing. The U-shaped yoke 28 is carried for vertical sliding movement between upright standards 32 on the base 25 and is adjustable to various heights relative to those standards by an adjusting screw 33 having a hand wheel 34 at its lower end and threaded into a stationary cross channel 35 which is secured to the standards 32. Thus, by turning the hand wheel 34, the discharge end of the whipping chamber may be raised or lowered relative to the feeding end and about the axis of the trunnions 24.

At the closed end of the whipping chamber, a bearing 36 is secured to the outer surface of the housing and at the opposite end of the whipping chamber a transversely extending yoke 37, secured to the end of the housing, provides a bearing 38. The bearings 36 and 38 are substantially coaxial and their axis is desirably coincident with the axis of curvature of the semicylindrical bottom 12 of the housing. A whipper shaft 39 is rotatably carried by the bearings 36 and 38 and projects outwardly through the closed end 16 of the housing and beyond the end of the bearing 36. In a machine such as that disclosed, in which the shaft 39 is relatively long, it is desirable to provide an intermediate bearing 41 carried by the side walls 13 and 14 near the mid-portion of the whipping chamber. A suitable pulley or sprocket 40 is mounted on and drivingly connected to the projecting end of the shaft and is driven by suitable flexible connecting means such as belts 42 from a drive pulley 43 mounted on the rotor shaft 44 of a driving motor 45. In the disclosed embodiments of my invention, the driving motor 45 is suspended below the housing of the whipping machine on a bracket 46. Preferably the pulleys 40 and 43 and their associated flexible connecting means are protected by being covered by a guard 47.

The shaft 39 carries a multiplicity of radially projecting whipping rods 48 which are disposed in spaced relationship axially of the shaft. Near the closed end of the whipping chamber the whipping rods 48 are spirally arranged in relation to the normal direction of rotation of the shaft 39 so that in addition to their whipping action, they tend to force the material in the whipping chamber toward the outlet opening. The remaining whipping rods 48 are arranged in axial rows extending substantially to the outlet opening of the whipping chamber. The length of all the whipping rods is desirably such that they extend to positions spaced from but closely adjacent the semi-cylindrical bottom wall of the whipping chamber.

To facilitate the collection of the whipped material at the open end of the whipping chamber, a downwardly sloping chute 49 is secured to the outer surface of the housing 18 over which chute the whipped material may be drained into a suitable receptacle.

Having particular reference to the form of my invention disclosed in Figs. 1 to 5 inclusive, a vat 50 for holding a supply of unwhipped material, is mounted on the top of the housing near the closed end thereof. Desirably the vat is closed at the bottom and has an open top into which new material is poured. The supply of relatively thick material, such as marshmallow, from the vat to the whipping chamber is preferably effected by the use of a pump 52 carried by the bracket 46. A pipe 53 connects the vat 50 to the intake side of the pump 52 while a pipe 54 provides a connection between the output side of the pump and the input or closed end of the whipping chamber. The pump 52 is provided with a drive pulley 55 and is driven from the shaft 39 by flexible driving means such as a belt 56 which connects the pulley 55 to a pulley 57 on the projecting end of the shaft 39. Through the use of the pump 52, the material is fed into the whipping chamber at a rate proportional to the speed of rotation of the whipping rods and at a suitable rate for whipping which is dependent upon the ratio of sizes of the pulleys 55 and 57.

As the material enters the whipping chamber from the input pipe 54, it first comes in contact with the spirally disposed whipping rods 48 at the closed end of the chamber. The speed of rotation of the shaft 39 and its associated whipping rods is desirably such that the material is thrown outwardly by centrifugal force, whereby the tendency is for the material to form a hollow cylindrical mass within the chamber so that the interior, as well as the exterior of the material, is exposed to air at atmospheric pressure during the whipping operation. The spirally disposed whipping rods near the closed end of the whipping chamber not only start the whipping action but also impart force to the material in a direction axial to the shaft and toward the output end of the whipping chamber. The force imparted by the spirally disposed whipping rods, together with the pushing action of new material flowing into the whipping chamber and the slope of the chamber as regulated by the position of the screw 33, combine to control the rate of flow of the material through the whipping chamber. Within certain limits the effect of gravity upon the rate of flow and the resultant whipping period are varied by regulating the slope of the whipping chamber.

The surface adhesion of the relatively sticky and stringy material to the inner surface of the whipping chamber during the whipping operation prevents the movement of the material at a rate anywhere near the speed of rotation of the whipping rods. This adhesion supplements the action of centrifugal force to hold the material in a cylindrical mass near the outer ends of the whipping rods. Since the outer portions of the whipping rods travel through the material at a rate exceeding the rate of movement of the material and its rate of flow, those rods leave pockets behind them in the material and consequently cause a suction which draws air into the material during the whipping. As the material flows together behind the rods, it closes in around the trapped air to form bubbles. The rate of movement of the rods through the material being relatively fast, the entrained air bubbles are small. By the time material has progressed through the whipping chamber, the beating action of the rods breaks up any large bubbles and effects a relatively even distribution of the bubbles throughout the whipped material.

In order to improve the agitation and aeration of the material during its progress through the whipping chamber, I have provided series of vanes 58 and 59 in the upper portion of the whipping chamber which extend inwardly between the successive whipping rods. The vanes of each series are substantially flat and elongated in shape. Also they are disposed in pairs as illustrated in Fig. 5 with the vanes of each pair lying in adjacent planes between the whipping rods.

The vanes 58 are wider than the diameter of the shaft and have bifurcated end portions 60 which straddle the shaft to support the inner ends. At their outer ends a rod 62 extends through the vanes 58 of the series and is carried by brackets 63 secured to the inner surface of the side wall 13 of the housing. Thus the vanes 58 of one series have their positions fixed within the housing.

In order to suit the whipping action of the machine to the material being whipped and the desired consistency to be attained during the whipping operation, it has been found advantageous to support the vanes 59 for angular movement in a plane relative to the vanes 58. I have therefore secured the inner ends of the vanes 59 to the vanes 58 at positions near the shaft 39 by fastening means such as rivets 64 which permit the swinging movement of the vanes 59 relative to the vanes 58. The other ends of the vanes 59 are connected together by a through rod 65, which rod also extends through slots 66 in depending flange portions 67 of threaded carrying elements 68. Each of the threaded carrying elements 68 is mounted for movement along a laterally disposed screw 69 which is journaled in the side walls 13 and 14 of the housing. Thus, rotation of the screws 69 moves the carrying elements 68 laterally across the upper portion of the whipping chamber and varies the angular disposition of the vanes 59 relative to the vanes 58 as indicated in dotted lines at 59a in Fig. 3.

To facilitate the adjustment of the vanes 59 during the operation of the machine and from outside of the whipping chamber, I have provided a hand wheel 70 and a beveled gear 72 on the projecting end of one of the screws 69 and have unified the control of the two screws 69 by the provision of a longitudinal shaft 73 carried exteriorly of the housing by brackets 74 and provided with beveled gears 75 which mesh with the gear 72 and another beveled gear 76 on the screw 69.

The vanes 58 and 59 are removable from the whipping chamber together, by removing the screws 69 to release the threaded carrying elements 68 and either removing the brackets 63 or suitable holding caps thereon to release the rod 62. Since the ends of the vanes 58 are bifurcated and ride on the shaft 39, both series of vanes may be lifted together from the top of the whipping chamber. The whipping machine may, if desired, be used for certain purposes or materials without the vanes 58 and 59 or may be converted for the whipping of other materials as shown in Figs. 6 and 7.

In the modification of my machine which is disclosed in Figs. 6 and 7, parts have been changed to adapt the machine to the whipping of materials such as fondant. Instead of utilizing the pump shown in Fig. 2 for forcing the unwhipped material into the end of the whipping chamber, the sugar syrup from which fondant is made is mixed in a vat 77 from which it drains through a suitable valve controlled aperture into a trough 78. From the trough 78 the syrup flows through an opening 79 in the top of the whipping chamber near the closed end thereof. As in the previously described form of my whipping machine, the sugar syrup first comes in contact with the spirally disposed whipping rods 48, which rods commence the whipping of the syrup and tend to force it toward the outlet opening of the whipping chamber.

In the whipping of materials such as fondant, however, it has been found desirable to commence the whipping with the action of the whipping rods and without the aid and increased agitation provided by vanes interposed between the whipping rods. Near the end of the whipping operation, a series of vanes 80 is interposed to effect increased agitation in the final portion of the whipping operation and after the syrup has been initially whipped by the rods.

As in the instance of the previously described vanes 58, the vanes 80 are substantially flat and elongated in shape, with their width somewhat greater than the diameter of the shaft 39. The inner ends of the vanes are supported by bifurcated end portions 82 which straddle the shaft intermediate certain ones of the whipping rods. The outer ends of the vanes are carried by a through rod 83 which is supported by brackets 84 on the inner surface of the housing wall 13.

Rather than being interposed between each pair of adjacent whipping rods along the shaft 39, as in the previously described form, I prefer to have more space between the adjacent vanes of the series. In the embodiment depicted in Fig. 6, there are three of the whipping rods 48 between adjacent vanes. Furthermore, in addition to the wider separation of the vanes and their use only near the outlet end of the whipping chamber, only stationary vanes are utilized.

In addition to the use of the stationary vanes in the whipping chamber, sloping upwardly and outwardly toward the side wall 13 of the housing from the shaft 39, I also prefer to utilize a longitudinally extending baffle 85 having a wall of cylindrical section facing inwardly from the side wall 14 of the housing opposite the side from which the vanes extend. This baffle is desirably removable for cleaning and conversion of the machine, but when installed, provides an upper continuation of the substantially semi-cylindrical curvature of the bottom wall of the whipping chamber. The placement of the vanes and baffle is dependent upon the normal direction of rotation of the shaft 39 and the attached whipping rods. As indicated in Fig. 7, the whipping rods move upwardly on the side to which the baffle is attached and downwardly on the side which carries the vanes. This placement of the baffle confines the material somewhat against the action of the centrifugal force and limits the extent to which it can build up over the whipping rods at the top.

From the foregoing description of the structure and operation of both forms of my whipping machine, it may be readily understood that they are adapted to continuous operation, as distinguished from whipping a batch of material at a time, by maintaining the supply of unwhipped material in either of the vats 50 or 77.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A whipping machine for aerating material used in confections and the like and comprising, in combination, a housing providing a whipping chamber having a semi-cylindrical bottom, a shaft disposed in the whipping chamber along the central axis of the semi-cylindrical bottom, means for rotatably supporting the shaft, a multiplicity of relatively narrow whipping rods secured to the shaft in axially spaced relationship and extending radially thereof, said rods being of a length such that their ends pass close to the semi-circular bottom of the chamber when the shaft is rotated, means for continuously supplying unwhipped material to the chamber near one end thereof, means for rotating the shaft at a speed such that the rods impart sufficient rotation to the material during the whipping that centrifugal force tends to cause said material to form a substantially tubular mass into which the ends of the rods extend, a series of vanes each having one end anchored to a wall of said chamber and the other end rotatably connected to said shaft between a pair of said axially spaced rods, a second series of vanes each having one end rotatably connected to one of the first mentioned series of vanes, adjustable means for supporting the other ends of said second series of vanes for movement about their rotatably supported ends in a direction toward and from the first mentioned series of vanes, said vanes being normally stationary and in planes extending between said rods so as to increase the agitation of said material between said rods, the end of said chamber opposite that at which the material is supplied being open to provide an outlet for the whipped material, and means for urging the material from the supply end to the outlet end of the chamber.

2. A whipping machine for aerating material used in confections and the like and comprising, in combination, a housing providing a whipping chamber having a semi-cylindrical bottom, a shaft disposed in the whipping chamber along the central axis of the semi-cylindrical bottom, means for rotatably supporting the shaft, a multiplicity of relatively narrow whipping rods secured to the shaft in axially spaced relationship and extending radially thereof, said rods being of a length such that their ends pass close to the semi-circular bottom of the chamber when the shaft is rotated, means for continuously supplying unwhipped material to the chamber near one end thereof, means for rotating the shaft at a speed such that the rods impart sufficient rotation to the material during the whipping that centrifugal force tends to cause said material to form a substantially tubular mass into which the ends of the rods extend, a series of vanes each having one end mounted on a rod and through said rod anchored to a wall of said chamber and the other end bifurcated and rotatably supported by said shaft between a pair of said axially spaced rods, whereby said vanes are removable as a unit from said chamber with said rod, said vanes being normally stationary and in planes extending between said rods so as to increase the agitation of said material between said rods, the end of said chamber opposite that at which the material is supplied being open to provide an outlet for the whipped material, and means for urging the material from the supply end to the outlet end of the chamber.

3. A whipping machine for aerating material used in confections and the like and comprising, in combination, a housing providing a whipping chamber having a semi-cylindrical bottom, a shaft disposed in the whipping chamber along the central axis of the semi-cylindrical bottom, means for rotatably supporting the shaft, a multiplicity of relatively narrow whipping rods secured to the shaft in axially spaced relationship and extending radially thereof, said rods being of a length such that their ends pass close to the semi-circular bottom of the chamber when the shaft is rotated, means for continuously supplying unwhipped material to the chamber near one end thereof, means for rotating the shaft at a speed such that the rods impart sufficient rotation to the material during the whipping that centrifugal force tends to cause said material to form a substantially tubular mass into which the ends of the rods extend, a series of vanes extending upwardly and outwardly from the mid-portion of said chamber and each having one end anchored to a wall of said chamber and the other end rotatably connected to said shaft between a pair of said axially spaced rods, an arcuately curved baffle extending longitudinally of said chamber and projecting inwardly from the wall of said chamber opposite said vanes at a position spaced somewhat from the ends of the whipping rods, said vanes being normally stationary and in planes extending between said rods so as to increase the agitation of said material between said rods, the end of said chamber opposite that at which the material is supplied being open to provide an outlet for the whipped material, and means for urging the material from the supply end to the outlet end of the chamber.

4. A whipping machine for aerating material used in confections and the like and comprising, in combination, a housing providing a whipping chamber having a semi-cylindrical bottom and substantially vertical side walls, a shaft disposed in the whipping chamber along the central axis of the semi-cylindrical bottom, means for rotatably supporting the shaft, a multiplicity of relatively narrow whipping rods secured to the shaft and projecting outwardly therefrom, means for rotating the shaft in one direction, material feeding means at one end of the chamber and an outlet opening at the other end thereof, said whipping rods near the material feeding means being spirally disposed relative to the shaft and in a relation to said one direction of rotation such that they tend to force material toward the outlet opening, the remainder of said whipping rods being in axially aligned rows, a water jacket for cooling the sides and bottom of said chamber, a series of substantially flat vanes somewhat wider than the diameter of the shaft and disposed with their flat surfaces in planes radial to the shaft, said vanes each having one end supported by the shaft and extending upwardly and outwardly therefrom with its other end secured to one of said side walls, another series of substantially flat vanes of similar width lying in adjacent and parallel planes and each having one end secured for relative swinging movement to the first mentioned series of vanes, the second mentioned series of vanes having the other ends supported in angular relation to the first mentioned series, and means for adjusting said angular relation of the vanes, said series of vanes being interposed between the whipping rods to increase the agitation of the material as it passes through the whipping chamber from the material feeding means to the outlet opening during rotation of the shaft and whipping rods.

5. A whipping machine for aerating material used in confections and the like and comprising, in combination, a housing providing a whipping chamber having a semi-cylindrical bottom and substantially vertical side walls, a shaft disposed in the whipping chamber along the central axis of the semi-cylindrical bottom, means for rotatably supporting the shaft, a multiplicity of relatively narrow whipping rods secured to the shaft and projecting outwardly therefrom, means for rotating the shaft in one direction, material feeding means at one end of the chamber and an outlet opening at the other end thereof, said whipping rods near the material feeding means being spirally disposed relative to the shaft and in a relation to said one direction of rotation such that they tend to force material toward the outlet opening, the remainder of said whipping rods being in axially aligned rows, a series of substantially flat vanes somewhat wider than the diameter of the shaft and disposed with their flat surfaces in planes radial to the shaft, said vanes each having one end supported by the shaft and extending upwardly and outwardly therefrom with its other end secured to one of said side walls, and another series of substantially flat vanes of similar width lying in adjacent and parallel planes and each having one end secured for relative swinging movement to the first mentioned series of vanes, the second mentioned series of vanes having the other ends supported in angular relation to the first mentioned series, said series of vanes being interposed between the whipping rods to increase the agitation of the material as it passes through the whipping chamber from the material feeding means to the outlet opening during rotation of the shaft and whipping rods.

6. A whipping machine for aerating material of relatively thick consistency and used in confections and the like comprising, in combination, a housing providing a whipping chamber having a semi-cylindrical bottom and side walls extending upwardly from the bottom to a top opening, a shaft disposed in the whipping chamber along the central axis of the semi-cylindrical bottom, means for rotatably supporting the shaft, a multiplicity of whipping rods secured to the shaft in axially spaced relationship and projecting outwardly therefrom, material feeding means at one end of the chamber and an outlet opening at the other end thereof, means for rotating the shaft, means for effecting flow of the material from the feeding means to the outlet opening during rotation of the shaft in one direction, a series of substantially flat vanes disposed in the top portion of the chamber and extending angularly inwardly and downwardly from one side wall of the chamber to said shaft, the inward and downward disposition of said vanes being so related to said one direction of rotation of the shaft that the material engages therewith after passing the major portion of said opening, said vanes being spaced apart distances related to the axial separation of the whipping rods and having their flat surfaces disposed in planes radial to the shaft and between the whipping rods, a second series of substantially flat vanes adjacent the first mentioned series, and means for adjusting the angular position of one series of vanes relative to the other in planes forming acute angles facing said top opening and approximately radial to the shaft.

7. In a whipping machine for aerating material of relatively thick consistency and the like, the combination comprising a whipping instrumentality comprehending a shaft carrying a multiplicity of whipping rods projecting radially from the shaft and spaced apart axially of the shaft, pairs of normally stationary vanes disposed in substantial acute angular relationship relative to one another and disposed in adjacent planes substantially perpendicular to the shaft, said pairs of vanes being spaced axially of the shaft, and means for supporting the vanes in positions intermediate the whipping rods.

FRANK S. NANNA.

REFERENCES CITED

The following references are of record in the file of this patent:

UNITED STATES PATENTS

| Number | Name | Date |
|---|---|---|
| 63,873 | Eagle | Apr. 16, 1867 |
| 338,121 | Wallace | Mar. 16, 1886 |
| 998,048 | Thomas | July 18, 1911 |
| 2,146,618 | Boudrant | Feb. 7, 1939 |
| 2,217,318 | Nanna | Oct. 8, 1940 |

FOREIGN PATENTS

| Number | Country | Date |
|---|---|---|
| 90,953 | Switzerland | Oct. 1, 1921 |
| 389,289 | Great Britain | Mar. 16, 1933 |